(12) United States Patent
Luo et al.

(10) Patent No.: US 8,699,486 B1
(45) Date of Patent: Apr. 15, 2014

(54) MANAGING MULTICAST DISTRIBUTION USING MULTICAST TREES

(75) Inventors: Yong Luo, Sunnyvale, CA (US); Vikram Rautela, Morgan Hill, CA (US); Abhishek Tripathi, Bangalore (IN); Venu Iyengar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 667 days.

(21) Appl. No.: 12/961,960

(22) Filed: Dec. 7, 2010

(51) Int. Cl.
  *H04L 12/28* (2006.01)
(52) U.S. Cl.
  USPC ............................ 370/390; 370/432; 370/351
(58) Field of Classification Search
  USPC ......... 370/229, 230, 235, 252, 351, 359, 419, 370/463, 389, 390, 432
  See application file for complete search history.

(56) References Cited

U.S. PATENT DOCUMENTS

| | | | |
|---|---|---|---|
| 5,666,360 A * | 9/1997 | Chen et al. | 370/390 |
| 7,263,099 B1 * | 8/2007 | Woo et al. | 370/390 |
| 7,710,963 B1 * | 5/2010 | Jain et al. | 370/390 |
| 2004/0114762 A1 * | 6/2004 | Medvinsky | 380/277 |
| 2006/0078110 A1 * | 4/2006 | Kim et al. | 380/30 |
| 2006/0114903 A1 * | 6/2006 | Duffy et al. | 370/390 |
| 2007/0140245 A1 * | 6/2007 | Anjum et al. | 370/390 |
| 2008/0205394 A1 * | 8/2008 | Deshpande et al. | 370/390 |
| 2008/0263130 A1 * | 10/2008 | Michalowitz et al. | 709/202 |
| 2009/0161594 A1 * | 6/2009 | Zhu et al. | 370/312 |
| 2010/0165989 A1 * | 7/2010 | Jain et al. | 370/390 |

* cited by examiner

*Primary Examiner* — Kwang B Yao
*Assistant Examiner* — Nguyen Ngo
(74) *Attorney, Agent, or Firm* — Harrity and Harrity, LLP

(57) ABSTRACT

A method includes receiving multicast traffic intended for host devices; identifying a flow associated with the multicast traffic; retrieving information associated with a group of multicast trees, where the group of multicast trees includes information associated with a group of I/O units, associated with a network node; identifying a particular tree that corresponds to the identified flow, where the particular tree includes information associated with a set of I/O units; and transferring the multicast traffic to an I/O unit, of the set of I/O units, based on the identification of the particular tree, where the transferring enables the I/O unit to send a copy of the multicast traffic to other I/O units of the set of I/O units, and the set of I/O units to process the multicast traffic in a manner that utilizes bandwidth or processing resources in a controlled manner and to send a copy of the multicast traffic to each of the host devices.

24 Claims, 8 Drawing Sheets

| SUB TREE SET 635 |
|---|
| {1,2,3} — 640 |
| {3,4,5} — 645 |
| {5,6,1} — 650 |
| {2,4,6} — 655 |

Fig. 6B

| SUB TREE SET 605 |
|---|
| {1,2,3} 612, 613 — 610 |
| {2,3,4} — 614 |
| {3,4,5} — 616 |
| {4,5,6} — 618 |
| {5,6,1} — 620 |
| {6,1,2} — 622 |

Fig. 6A

MANAGING MULTICAST DISTRIBUTION USING MULTICAST TREES

BACKGROUND

In an increasingly networked world, more and more traffic, such as data, voice, and video, is transmitted over public and proprietary networks. The public or private networks process traffic based on the type of traffic (e.g., text, data, video, etc.), a particular quality of service (QoS) with respect to the traffic, a category of traffic (e.g., unicast, broadcast, or multicast traffic), etc. When processing broadcast and/or multicast traffic, network nodes within the public or private networks may replicate received traffic in order to transmit a copy of the traffic to host devices that are authorized to receive the traffic.

Unfortunately, when performing replications associated with multicast traffic, network nodes may not fully utilize the bandwidth and/or processing capacity of the network nodes. Additionally, network nodes may generate more copies of the traffic than are to be transmitted to the host devices, which may cause the network nodes to waste bandwidth resources and/or processing capacity. Wasting the bandwidth resources and/or processing capacity may cause the network nodes to become congested and/or reduce the throughput of the public or private networks.

SUMMARY

According to one aspect, a method may include receiving, by a first input/output (I/O) unit of a group of I/O units associated with a network node, multicast traffic intended for a group of host devices; identifying, by the first I/O unit, a flow associated with the multicast traffic based on information obtained from the multicast traffic; retrieving, by the first I/O unit and from a memory associated with the network node, information associated with two or more multicast trees, where the two or more multicast trees may include information associated with all or a portion of the group of I/O units, associated with the network node, that process multicast traffic. The method may also include identifying, by the first I/O unit, a particular tree, of the two or more multicast trees, that corresponds to the identified flow, where the particular tree may include information associated with one or more I/O units of the group of I/O units; and transferring, by the first I/O unit, the multicast traffic to a second I/O unit, of the one or more I/O units, based on the identification of the particular tree, where the transferring may enable the second I/O unit to distribute a copy of the transferred multicast traffic to other I/O units of the one or more I/O units, and the one or more I/O units to process the multicast traffic in a manner that utilizes bandwidth or processing resources in a controlled manner and to send a copy of the multicast traffic to each of the group of host devices based on the processing.

According to another aspect, a network node may include a memory to store information associated with a group of sub trees that correspond to a group of I/O units associated with the network node; and a switch fabric to transfer multicast traffic between the group of I/O units. The network node may also include a first I/O unit, of the group of I/O units to receive multicast traffic intended for a group of host devices connected to the network node; identify one or more of the group of sub trees with which to process the multicast traffic based on one or more flows associated with the multicast traffic; send, to a second I/O unit of the group of I/O units and via the switch fabric, a portion of the multicast traffic associated with one of the one or more flows that corresponds to a sub tree of the group of sub trees, where the sub tree may include information associated with the second I/O unit and a set of other I/O units of the group of I/O units. The network node may further include the second I/O unit to receive the portion of the multicast traffic; send a copy of the portion of the multicast traffic to the set of I/O units that permits the second I/O unit and the set of I/O units to generate a group of copies to be outputted to one or more of the group of host devices.

According to yet another aspect, a method performed by a network node may include receiving, by a first input/output (I/O) unit associated with the network node, multicast traffic intended for a group of host devices connected to the network node; and identify whether the multicast traffic is to be processed based on a binary tree or an inverse binary tree based on a flow associated with the multicast traffic. The binary tree may include a first root node associated with a second I/O unit and a group of leaf nodes, associated with two or more I/O units, of a group of I/O units associated with the network node, that are logically connected to the first root node. The inverse binary tree may include a second root node associated with a third I/O unit and a group of other leaf nodes, associated with two or more other I/O units of the group of I/O units, that are logically connected to the second root node. The method may also include sending, by the first I/O unit and to the second I/O unit, the multicast traffic to be processed based on a determination that the identified flow corresponds to the binary tree, where the sending to the second I/O unit may permit the second I/O unit and the two or more I/O units to process the multicast traffic in a manner that enables a copy of the multicast traffic to be outputted to the group of host devices. The method may further include sending, by the first I/O unit and to the third I/O unit, the multicast traffic to be processed based on a determination that the identified flow corresponds to the inverse binary tree, where the sending to the third I/O unit may permit the third I/O unit and the two or more other I/O units to process the multicast traffic in a manner that enables a copy of the multicast traffic to be outputted to the group of host devices.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 6A and 6B are diagrams illustrating example sub tree data structures used by the network node in the environment shown in FIG. 1;

DETAILED DESCRIPTION

The following detailed description refers to the accompanying drawings. The same reference numbers in different drawings may identify the same or similar elements. Also, the following detailed description does not limit the invention.

Systems and/or methods described herein may include techniques for processing multicast traffic in a manner that does not cause excess copies of the traffic to be generated by a network node and/or that balances processing capacity and/or utilization of bandwidth recourses among packet forwarding components of the network node. As described herein, a load balancing application may distribute the incoming multicast traffic to a packet forwarding component (e.g., an input/output (I/O) component, a packet forwarding engine (PFE), etc.), within the network node, to be processed based on a flow with which the incoming multicast traffic is associated. The term "flow," as used herein, may include a group of multicast packets associated with common attributes, such as a destination address, a source address, quality of service (QoS), a traffic type (e.g., text, video, voice, data, etc.), a type of service (e.g., messaging, security, operations and maintenance, etc.), etc.

Load balancing processor 310 may perform a load balancing operation on the incoming multicast traffic (e.g., using a multicast tree and/or a group of multicast trees as described in detail below) in order to control and/or manage the manner in which the incoming multicast traffic is to be distributed for processing. Additionally, or alternatively the load balancing operation may cause a packet forwarding component to generate copies of the multicast traffic intended for recipients (e.g., host devices) included in a group membership corresponding to the multicast traffic and without generating excess copies of the multicast traffic that are not to be sent to the intended recipients. By not generating the excess copies of the multicast traffic, bandwidth and/or processing resources within the network node may be preserved and/or allocated to perform other functions.

As described herein, distribution of the incoming multicast traffic based on the flow enables bandwidth resources and/or processing capacity of the network node to be apportioned and/or balanced among the packet forwarding components associated with a network node. Additionally, apportioning and/or balancing the processing among the packet forwarding components may enable the network node to avoid becoming congested by preventing a particular packet forwarding component from becoming over-tasked (e.g., when processing and/or available bandwidth capacity has been reached).

Figure 1:
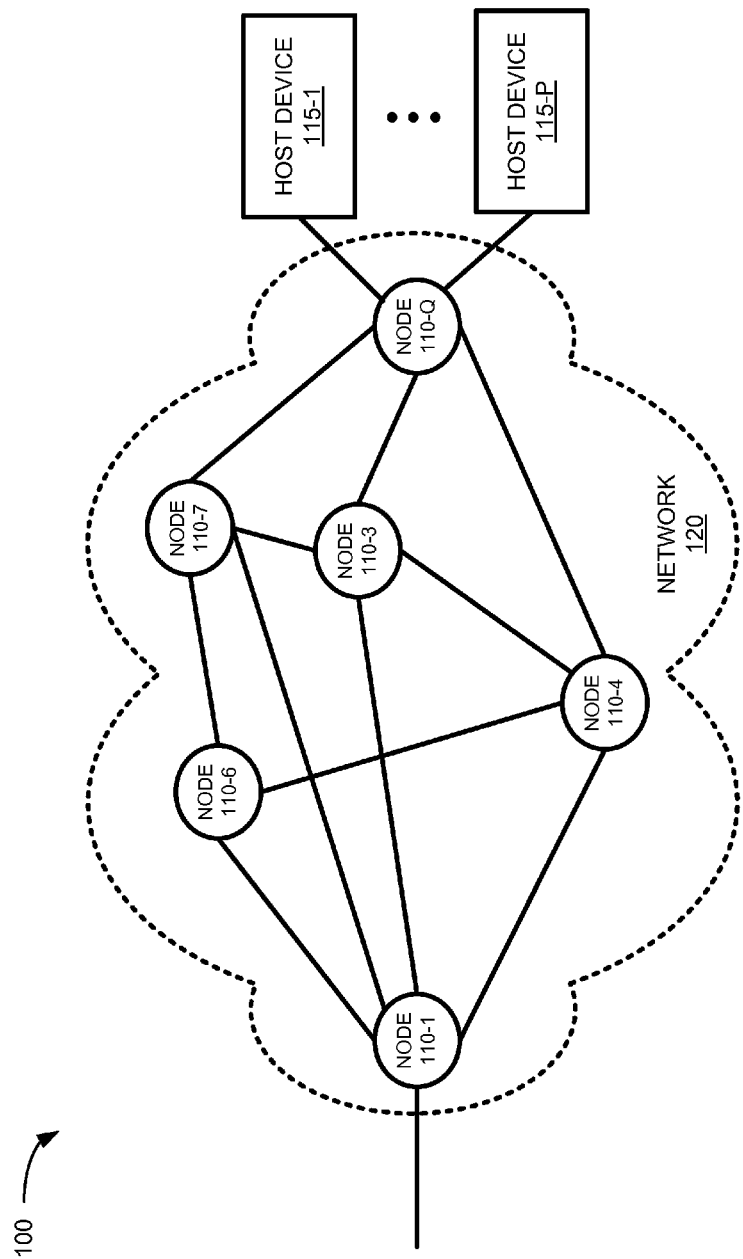
FIG. 1 is a diagram illustrating an example environment in which systems and/or methods, described herein, may be implement.

FIG. 1 is a diagram illustrating an example environment 100 in which systems and/or methods described herein may be implemented. As shown in FIG. 1, environment 100 may include a group of network nodes 110-1, . . . , node 110-Q (where Q≥1) (hereinafter collectively referred to as "nodes 110" and individually as "node 110"), a group of host devices 115-1, . . . , 115-P (where P≥1) (hereinafter collectively referred to as "hosts 115" and individually as "host 115"), and interconnected by a network 120. FIG. 1 shows an example of devices that may be included in environment 100. In other implementations, environment 100 may include fewer devices, different devices, differently arranged devices, or additional devices than depicted in FIG. 1. In still other implementations, one or more devices of environment 100 may perform one or more tasks described as being performed by one or more other devices of environment 100.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables and/or packet forwarding tables. In another example, node 110 may store, in the storage device and/or memory, information associated with a virtual local area network (VLAN) hosted by node 110.

In one example, node 110 may process incoming multicast traffic. For example, node 110 may receive incoming multicast traffic and may generate copies of the traffic to be transmitted to other nodes 110 and/or hosts 115 based on which other nodes 110 and/or hosts 115 are included in a membership group associated with the multicast traffic. When processing the traffic, node 110 may perform a load balancing operation that enables node 110 to replicate the incoming traffic in a manner that does not create excess copies of the traffic that are not destined for intended recipients (e.g., hosts 115) and/or that processes the traffic based on a particular flow with which the traffic is associated.

Host 115 may include any computation or communication device, such as a wireless mobile communication device that is capable of communicating via network 120. For example, host 115 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a landline telephone, a set top box (STB), a television, a camera, a personal gaming system, or another type of computation or communication device. In another implementation, host 115 may be a server device that may gather, process, search, store, and/or provide information in a manner similar to that described herein.

Host 115 may be associated with unique identification information, such as a device identifier (e.g., a STB identifier, an IP address, a MAC address, an international mobile subscriber identity (IMSI), a national access identifier (NAI), etc.), a public identifier (e.g., a mobile device number (MDN), a landline device number (LDN), a mobile subscriber integrated services digital network (MSISDN), etc.), that may permit node 110 to distinguish between hosts 115 and/or determine group membership associated with multicast traffic. Additionally, or alternatively, host 115 may, for example, receive multicast traffic from node 110. In another example, host 115 may send Internet Group Management Protocol (IGMP) traffic to node 110 that includes multicast membership group requests to receive particular multicast traffic (e.g., a join) or to stop receiving the particular multicast traffic (e.g., a leave).

Network 120 may include one or more wired and/or wireless networks. For example, network 120 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 120 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

Figure 2:
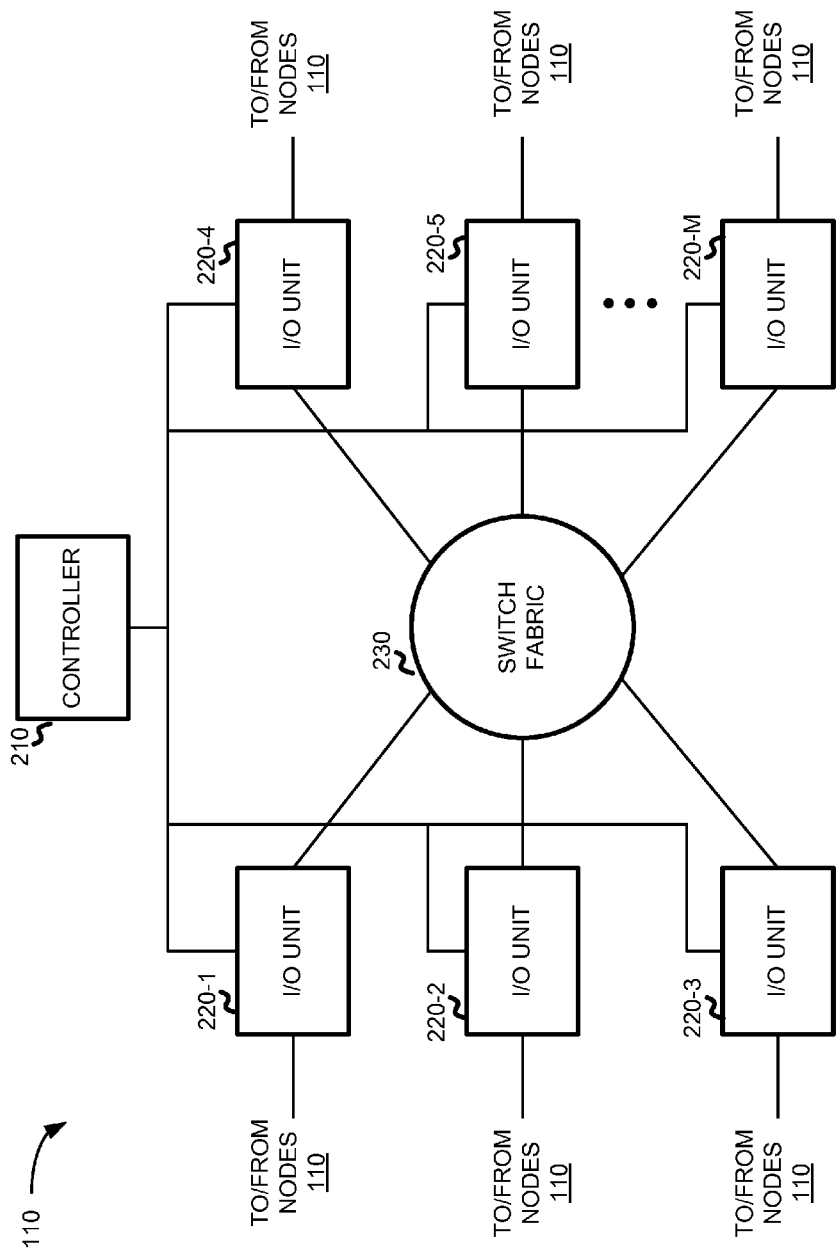
FIG. 2 is a diagram illustrating example components of a network node in the environment shown in FIG. 1.

FIG. 2 is a diagram illustrating example components of node 110. In this example implementation, node 110 may take the form of a router, although the systems and/or methods herein may be implemented in another type of network device. For example, node 110 may include another data transfer device, such as a gateway, a switch, a firewall, a network interface card (NIC), a hub, a bridge, a proxy server, an optical add-drop multiplexer (OADM), or some other type of device that processes and/or transfers traffic.

Although, FIG. 2 illustrates example components of node 110, in other implementations, node 110 may include additional components, fewer components, different components, or differently arranged components than those illustrated in FIG. 2 and described herein. Additionally, or alternatively, one or more operations described as being performed by a particular component of node 110 may be performed by one or more other components, in addition to or instead of the particular component of node 110.

Node 110 may receive network traffic, as one or more packet stream(s), from physical links, may process the packet stream(s) to determine destination information, and may transmit the packet stream(s) out on links in accordance with the destination information. Node 110 may include a controller 210, a set of input/output (I/O) units 220-1, 220-2, ..., 220-M (where M≥1) (hereinafter referred to collectively as "I/O units 220" and individually as "I/O unit 220"), and a switch fabric 230.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high level management functions for node 110. For example, controller 210 may maintain the connectivity and manage information/data necessary for transferring packets by node 110. Controller 210 may create routing tables based on network topology information, create forwarding tables based on the routing tables, and communicate the forwarding tables to I/O units 220. I/O units 220 may use the forwarding tables to perform route lookup for incoming packets and perform the forwarding functions for node 110. Controller 210 may also perform other general control and monitoring functions for node 110. In one example, controller 210 may generate multicast routing tables based on multicast membership information. In another example, controller 210 may generate and/or update multicast trees, such as binary trees or sub trees (e.g., as described in detail below) which may be used when processing multicast traffic. Controller 210 may forward the multicast forwarding tables and/or information associated with multicast trees to I/O units 220.

I/O unit 220 may include a component or collection of components to receive packets, to process incoming and/or outgoing packets, and/or to transmit outgoing packets. For example, I/O unit 220 may include I/O ports, a packet forwarding component, an Ethernet interface and/or another type of interface, a central processing unit (CPU), and/or a memory device. I/O unit 220 may include a collection of ports that receive or transmit packets via physical links. I/O unit 220 may also include packet processing component(s), switch interface component(s), Internet processor component(s), memory device(s), etc. Each of I/O units 220 may be connected to controller 210 and switch fabric 230. I/O units 220 may receive packet data on physical links connected to a network (e.g., network 120). Each physical link could be one of many types of transport media, such as an optical fiber or an Ethernet cable.

I/O units 220 may process incoming packet data prior to transmitting the data to another I/O unit 220 or the network. I/O units 220 may perform route lookups for the data using the forwarding table from controller 210 to determine destination information. If the destination indicates that the data should be sent out on a physical link, connected to I/O unit 220, then I/O unit 220 may prepare the data for transmission by, for example, adding any necessary headers and/or modifying existing headers, and/or transmitting the data from the port associated with the physical link. If the destination indicates that the data should be sent to another I/O unit 220 via switch fabric 230, then I/O unit 220 may, if necessary, prepare the data for transmission to the other I/O unit 220 and/or may send the data to the other I/O unit 220 via switch fabric 230.

I/O units 220 may process incoming multicast traffic and may perform a load balancing operation on the multicast traffic. For example, I/O unit 220 receive multicast traffic and may, based on the forwarding tables, determine that the multicast traffic is to be sent, by I/O unit 220, to a particular next hop (e.g., another I/O unit 220, another node 110, host 115, etc.). Based on the determination, I/O unit 220 may generate a copy of the multicast traffic for transmission to the next hop. I/O unit 220 may determine to which I/O unit 220 the multicast traffic is to be sent based on a flow to which the traffic corresponds. I/O unit 220 may send the multicast traffic to a particular I/O unit 220, via switch fabric 230, based on a multicast tree that corresponds to the flow. The particular I/O unit 220 may receive the multicast traffic and may send replication notifications to other I/O units 220 based on the multicast tree. The particular I/O unit 220 and the other I/O units 220 may receive the notifications and may replicate the multicast traffic based on group membership associated with the multicast traffic and may forward copies of the multicast traffic to other nodes 110 and/or hosts 115 based on the multicast group membership and/or other I/O units 220 to be forwarded, by the other I/O units 220, to the other nodes 110 and/or hosts 115.

Switch fabric 230 may include one or multiple switching planes to facilitate communication among I/O units 220 and/or controller 210. In one implementation, each of the switching planes may include a single-stage switch or a multi-stage switch of crossbar elements. Switch fabric 230 may also, or alternatively, include processors, memories, and/or paths that permit communication among I/O units 220 and/or controller 210.

Figure 3:
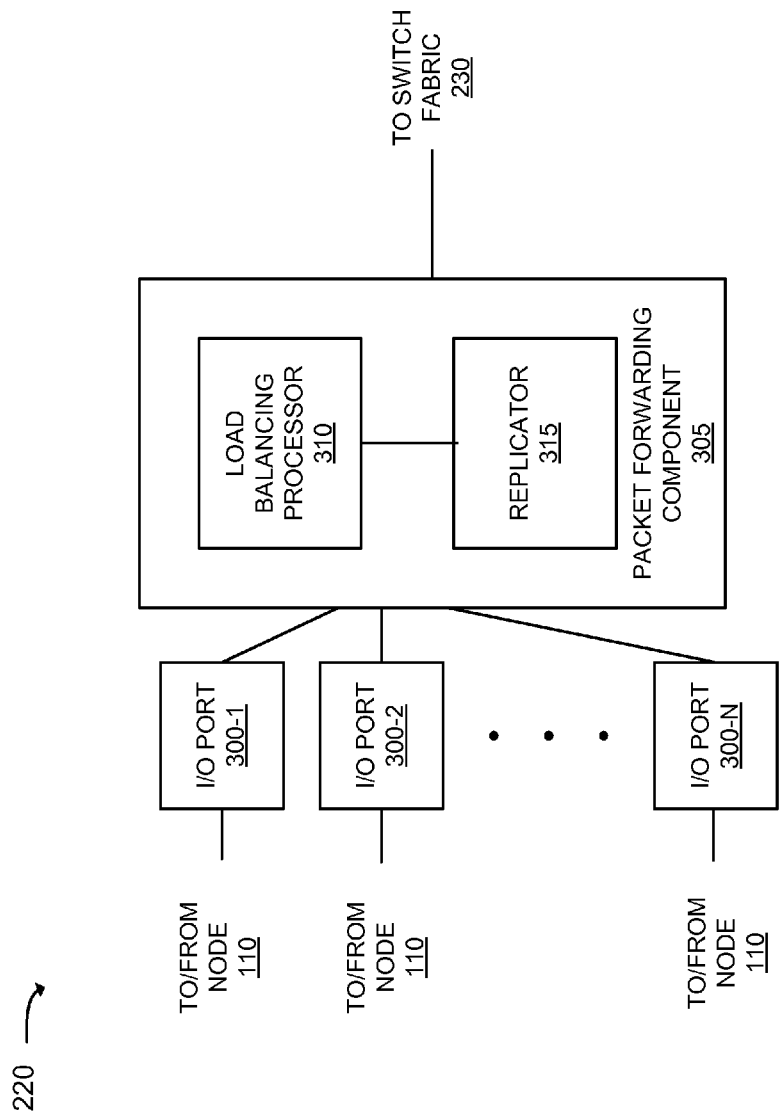
FIG. 3 is a diagram illustrating example components of an I/O unit depicted in FIG. 2.

FIG. 3 is a diagram illustrating example components of I/O unit 220. Components of I/O unit 220 may particularly include components to perform load balancing operations associated with processing multicast traffic. As illustrated in FIG. 3, I/O unit 220 may include a group of input/output (I/O) ports 300-1, ..., 300-N and/or a packet forwarding component 305.

I/O ports 300 may be a point of attachment for a physical link and/or may include a component to receive, transmit, and/or process packets associated with traffic (e.g., multicast traffic and/or other traffic) received from and/or sent to another node 110 and/or host 115. For example, I/O ports 300 may include an Ethernet interface, an OC interface, an ATM interface, or another type of interface. I/O ports 300 may include a variety of physical interfaces via which packets can be received, can be transmitted, or can be received and transmitted. In another implementation, I/O ports 300 may collectively comprise a physical interface card (PIC). I/O ports 300 may be connected to packet forwarding component 305 and may send incoming packets to packet forwarding component 305 and/or may receive outgoing packets from packet forwarding component 305.

Packet forwarding component 305 may include a one or more components to receive packets, process incoming and/or outgoing packets, and/or transmit outgoing packets. For example, packet forwarding component 305 may include an Ethernet interface and/or another type of interface, a CPU, and/or a memory device. Packet forwarding component 305 may include packet processing component(s), switch interface component(s), Internet processor component(s), memory device(s), etc. Alternatively, or additionally, packet forwarding component 305 may include a load balancing processor 310 and a replicator 315. Packet forwarding component 305 may be interconnected with I/O ports 300 and/or switch fabric 230, and/or other components within I/O unit 220.

Load balancing processor 310 may include a processor, a microprocessor, or some form of hardware logic (e.g., an ASIC or a FPGA) and/or a component or collection of components to perform a load balancing operation on incoming or outgoing multicast traffic. In one example implementation, load balancing processor 310 may include software or logic associated with a load balancing application that performs load balancing operations on incoming multicast traffic.

Load balancing processor 310 may determine a quantity of copies of the multicast traffic based on a group membership (e.g., stored in a memory associated with I/O unit 220) associated with the multicast traffic. Load balancing processor 310 may, for example, identify to which nodes 110 and/or hosts 115 a copy of the multicast traffic is to be sent based on the group membership. Additionally, or alternatively, load balancing processor 310 may perform a load balancing operation on the multicast traffic by determining to which other I/O units 220 the multicast traffic is to be sent to be processed in order to send the copies of the multicast traffic to the identified nodes 110 and/or hosts 115. Sending the multicast traffic to other I/O units 220 to be processed may enable bandwidth resources and/or processing capacity, associated with replicating the multicast traffic (e.g., to generate the desired quantity of copies of the multicast traffic), to be allocated and/or distributed to the other I/O units 220 in a controlled and/or managed manner and/or in a manner that does not waste bandwidth and/or processing resources.

Load balancing processor 310 may receive multicast traffic and may identify a flow with which the multicast traffic is associated. The flow may be determined based on flow information obtained from a header of packets associated with the multicast traffic, such as a destination address, a source address, QoS, a traffic type (e.g., text, video, voice, data, etc.), type of service (e.g., messaging, security, operations and maintenance, etc.), etc. In one example, load balancing processor 310 may generate a unique value that corresponds to the flow using a hash function and/or some other mathematical function based on the flow information. Each flow within the multicast traffic may have a unique value that may be used by load balancing processor 310 when performing the load balancing operation.

In one example implementation, load balancing processor 310 may use the unique value (e.g., obtained using the hash function) associated with the flow to determine the manner in which multicast traffic is to be forwarded to other I/O units 220 based on one or more multicast trees, such as a pair of binary trees (e.g., described in detail below in FIG. 4) that correspond to all or a portion of the I/O units 220 that perform replication operations associated with node 110. For example, a particular binary tree, of the pair of binary trees, may be selected based on the unique value that corresponds to the particular binary tree. Load balancing processor 310 may forward the multicast traffic, via switch fabric 230, to another I/O unit 220 based on the selected binary tree.

In another example implementation, load balancing processor 310 may use the unique value associated with the flow determine the manner in which the multicast traffic is to be forwarded to the other I/O units 220 based on one or more other multicast trees, such as a group of sub trees (e.g., described in detail below in FIGS. 6 and 7) that correspond to all or a portion of the I/O units 220 that perform replication operations. For example, a particular sub tree may be selected, from the group of sub trees, based on the unique value that corresponds to the particular sub tree. Load balancing processor 310 may forward the multicast traffic to another I/O unit 220, via switch fabric 230, based on the selected sub tree.

Load balancing processor 310 may determine that a copy of the incoming multicast traffic is to be transmitted, by I/O unit 220, to a host device 110 and/or other node 110 in a manner that does not include switch fabric 230. The load balancing application may, for example, send a replication notification to replicator 315 that instructs replicator 315 to generate one or more copies of the multicast traffic to be sent to the host device 110 and/or the other node 110. In another example, forwarding component 305, associated with I/O unit 220, may receive other multicast fabric from another I/O unit 220 via switch fabric 230 and/or a notification to perform a replication operation on the other multicast traffic. Load balancing processor 310 may send another replication notification to replicator 315 that instructs replicator 315 to generate one or more copies of the other multicast traffic to be sent to host devices 110 and/or the other nodes 110 associated with a group membership associated with the other multicast traffic.

Replicator 315 may include one or more components to perform replication operations on multicast traffic. Replicator 315 may receive instructions (e.g., a replication notification) from load balancing processor 310 to perform a replication operation on multicast traffic and replicator 315 may generate one or more copies of multicast traffic in response to the instruction. Replicator 315, may forward the one or more copies of the multicast traffic to another I/O unit 220 via switch fabric 230, and/or to node 110 and/or host 115 via I/O port 300. In another example, the multicast traffic may be forwarded by load balancing processor 310, forwarding component 305, and/or another component associated with I/O unit 220.

Although, FIG. 3 illustrates example components of I/O unit 220, in other implementations, I/O unit 220 may include additional components, fewer components, different components, or differently arranged components than those illustrated in FIG. 3 and described herein. Additionally, or alternatively, one or more operations described as being performed by a particular component of I/O unit 220 may be performed by one or more other components, in addition to or instead of the particular component of I/O unit 220.

Figure 4:
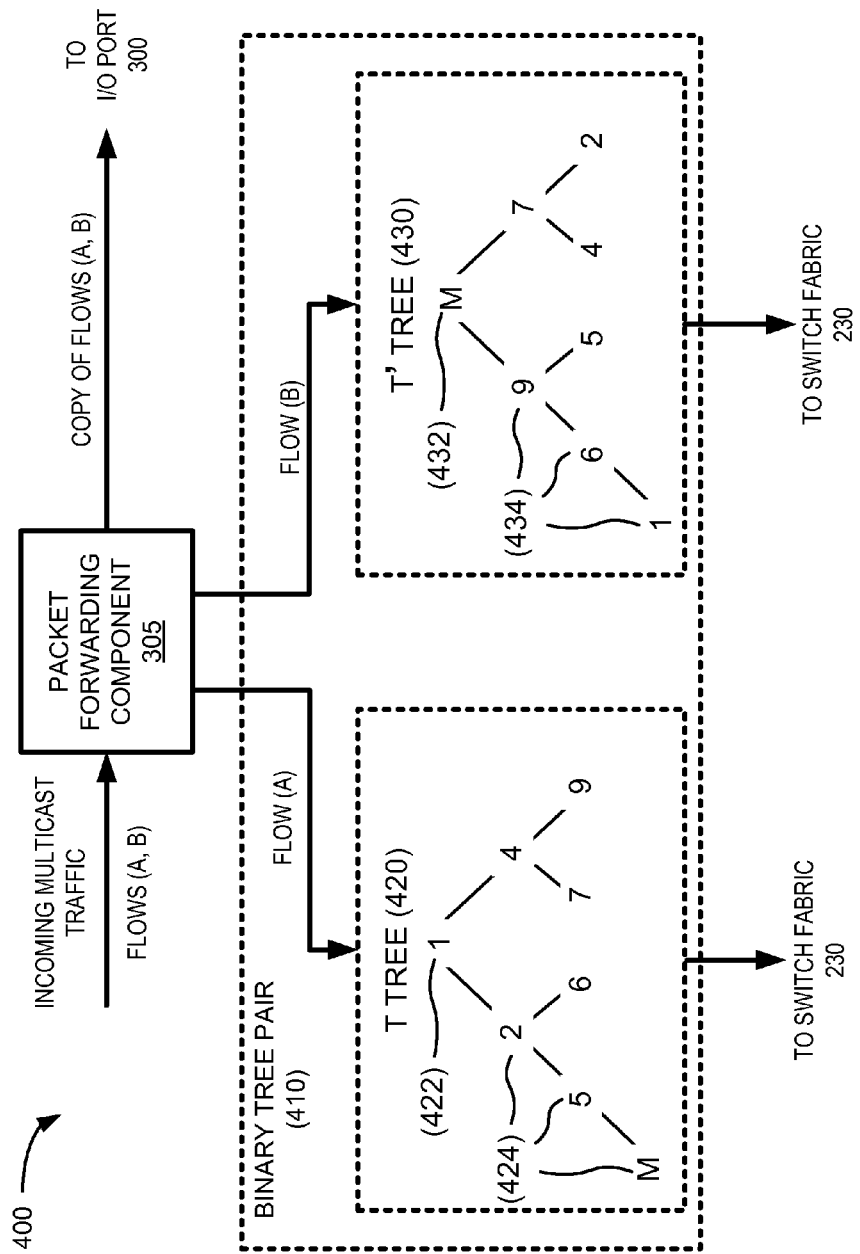
FIG. 4 is a diagram illustrating an example a load balancing operation, using a binary tree pair, according to an implementation described herein.

FIG. 4 is a diagram illustrating an example a load balancing operation 400 using a binary tree pair according to an implementation described herein. For example, packet forwarding component 305, associated with I/O unit 220, may receive incoming multicast traffic, via I/O port 300, intended for nodes 110 and/or hosts 115 (e.g., included within a group membership associated with the multicast traffic). As shown in FIG. 4, the multicast traffic may include one or more flows (e.g., shown as flows (A, B)). The load balancing application, hosted by load balancing processor 310 within packet forwarding component 305, may determine with which flow the multicast traffic is associated (e.g., based on flow information associated with the multicast traffic) in a manner similar to that described above (e.g., with respect to FIG. 3). Load balancing processor 310 may, for example, use a hash function and/or some other mathematical function to generate a unique value associated with the flow based on the flow information obtained from the multicast traffic. Load balancing processor 310 may use a binary tree pair (e.g., binary tree pair (410)) to determine to which other I/O unit 220 the multicast traffic (e.g., associated with the identified flow) is to be forwarded for processing. More particularly, load balancing processor 310 may select a binary tree (e.g., T tree (420)) or T' tree (430)), from the binary tree pair, that is to be used to process the multicast traffic based on the identified flow to which the selected binary tree corresponds.

Binary tree pair 410 may permit multicast traffic to be distributed among all or a portion of I/O units 220 within node 110 in order to process the multicast traffic in a manner that does not cause a particular I/O unit 220 to be over tasked (e.g., where maximum processing and/or bandwidth capacity is reached) and/or to maximize traffic throughput via node 110. Binary tree pair 410 may include information associated with T tree 420 and/or T' tree 430. Binary tree pair 410 may enable load balancing processor 310 to forward the multicast traffic, using the information associated with T tree 420 or T' tree 430, based on the identified flow.

T tree 420 may include information associated with each I/O unit 220 that is to perform replication operations within node 110 (e.g., I/O units 220-1, 220-2, 220-4 through 220-7, 220-9, and 220-M; shown as "1," "2," "4" through "7," "9", and "M" in FIG. 4). T tree 420 may include a root node 422 and/or one or more leaf nodes 424. Root node 422 may correspond to a particular I/O unit 220 (e.g., I/O unit 220-1; shown as "1" in FIG. 4)) and leaf nodes 424 may correspond to the other I/O units 220 within T tree 420 (e.g., I/O units 220-2, 220-4 through 220-7, 220-9, and 220-M; shown as "2," "4" through "7", "9," and "M" in FIG. 4). T tree 420 may include logical interconnections between root node 422 (e.g., 1) and a pair of leaf nodes 424 (e.g., 2 and 4). Additionally, the pair of leaf nodes 424 may each be logically interconnected with another pair of leaf nodes 424 (e.g., 5 and 6 corresponding to 2; and 7 and 9 corresponding to 4). One or more of leaf nodes 424 (e.g., 5), associated with the other pair of leaf nodes 424, may be logically interconnected with another leaf node 424 (e.g., M).

T' tree 430 may include information associated with each I/O unit 220 that is included in the other binary tree (e.g., T tree 420) of binary tree pair 410. T' tree 430 may include a root node 432 and/or one or more leaf nodes 434. In an example implementation, T' tree 430 may be an inverse of T tree 420. For example, a particular leaf node 424 (e.g., M) of T tree 420 that is the furthest logical distance from root node 422, within T tree 420, may be a root node (e.g., root node 432) within T' tree 430. Conversely, root node 422 (e.g., 1), of T tree 420, may be a leaf node 434 associated with a furthest logical distance (e.g., a distance of three in this example) from root node 434 within T' tree 430. Leaf nodes 422 that were the second furthest logical distance within T tree 420 may, for example, be a pair leaf nodes 434 (e.g., 7 and 9) that are logically interconnected (e.g., associated with a distance of one) with root node 432. Leaf nodes 424 (e.g., 6) associated with the second furthest logical distance within T tree 420 and/or that do not generate copies of multicast traffic to be forwarded to other I/O units 220 may, for example, be leaf node 434, within T' tree 430, that perform replication operations in order to forward copies of the multicast traffic to other I/O units 220. Leaf nodes 424 (e.g., 5) associated with the second furthest logical distance within T tree 420 and/or that generate copies of multicast traffic to be forwarded to other I/O units 220 may, for example, be leaf node 434, within T' tree 430, that do not perform replication operations to forward copies of the multicast traffic to other I/O units 220.

If load balancing processor 310 identifies the multicast traffic as being associated with flow (A), then load balancing processor 310 may retrieve, from a memory associated with I/O unit 220, information associated with a binary tree that corresponds to flow (A) (e.g., T tree 420). Based on the information associated with the binary tree, load balancing processor 310 may forward, via switch fabric 230, the incoming multicast traffic (e.g., associated with flow (A)) to another I/O unit 220 (e.g., I/O unit 220-1) that corresponds to root node 422 associated with the binary tree. It should be appreciated that the forwarding of the incoming multicast traffic is generally performed without replicating or generating a copy of the multicast traffic, which preserves bandwidth and/or processing resources associated with node 110.

The other I/O unit 220 may receive the multicast traffic and may replicate the multicast traffic in order to send, via switch fabric 230, a copy of the multicast traffic to a pair of I/O units 220 (e.g., I/O unit 220-2 and/or I/O unit 220-4) that correspond to the pair of logically interconnected leaf nodes 424 identified in the binary tree (e.g., T tree 420). The pair of I/O units 220 may each replicate the multicast traffic in order to send, via switch fabric 230, the copies of the multicast traffic to the other pairs of I/O units 220 (e.g., I/O units 220-5 through 220-7, and/or 220-9) that correspond to the other pair of logically interconnected leaf nodes 424 identified in the binary tree. I/O units 220 associated with the other pair of logically interconnected leaf nodes 424 may perform other replications of the multicast traffic until all replicating I/O units 220 associated with the binary tree have receive a copy of the multicast traffic.

Each I/O unit 220, included in the binary tree, that received a copy of the multicast traffic may generate additional copies of the multicast traffic that corresponds to other respective nodes 110 and/or respective hosts 115 that are included in the membership group associated with the multicast traffic. Additionally, or alternatively, each I/O unit 220 may send a copy of the multicast traffic to the respective other nodes 110 and/or hosts 115.

In another example, if load balancing processor 310 identifies the multicast traffic as being associated with flow (B), then load balancing processor 310 may retrieve, from a memory associated with I/O unit 220, information associated with another binary tree that corresponds to flow (B) (e.g., T' tree 430). Based on the information associated with the other binary tree (e.g., an inverse binary tree), load balancing processor 310 may forward, via switch fabric 230, the incoming multicast traffic (e.g., associated with flow (B)) to another I/O unit 220 (e.g., I/O unit 220-M) that corresponds to root node 432 associated with the binary tree. It should be appreciated that the forwarding of the incoming multicast traffic is generally performed without replicating or generating a copy of the multicast traffic, which preserves bandwidth and/or processing resources associated with node 110. Additionally, or alternatively, processing the multicast traffic associated with flow (B), using the other binary tree, increases a diversity in which bandwidth and/or processing resources of node 110 are distributed among I/O units 220 when processing multicast traffic.

I/O unit 220-M may receive the multicast traffic and may perform replication operations and/or forwarding operations (e.g., via switch fabric 230) to leaf nodes 434 in a manner similar to that described above (e.g., with respect to T tree 420). Alternatively, or additionally, leaf nodes 434, associated with T' tree 430, may perform further replication and/or forwarding operations (e.g., via switch fabric 230) and may send copies of the multicast traffic (e.g., associated with flow (B), to other nodes 110 and/or hosts 115 that are included within a group membership associated with the multicast traffic.

In yet another example, I/O unit 220 may receive the incoming multicast traffic (e.g., associated with flow (A) and/or flow (B)) and may perform replication operations on the multicast traffic based on a determination that copies of the multicast traffic are to be sent to other nodes 110 and/or hosts 115 in a manner that does not include switch fabric 230.

Figure 5:
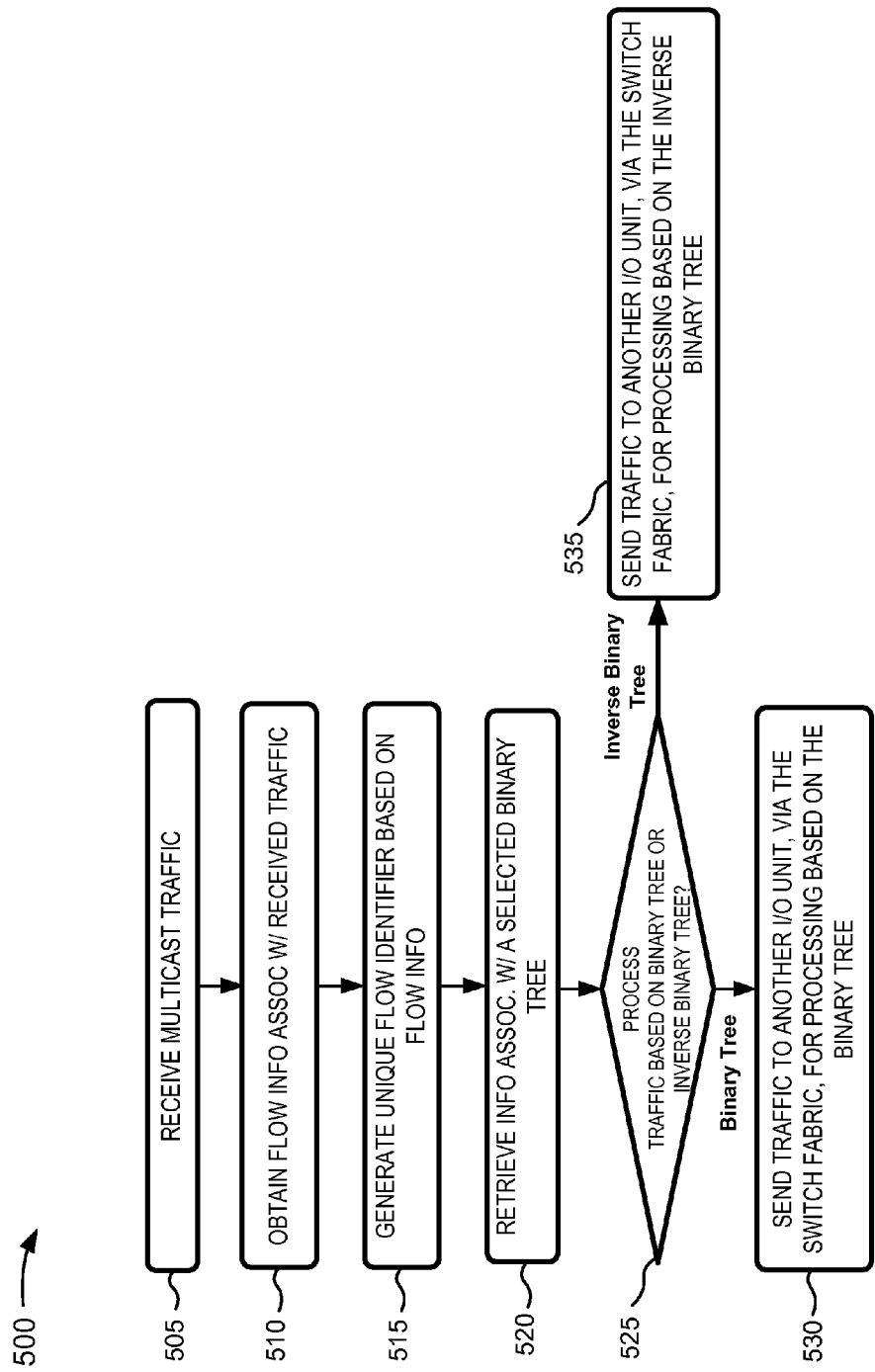
FIG. 5 is a diagram illustrating an example process for processing multicast traffic using a binary tree pair.

FIG. 5 is a diagram illustrating an example process 500 for processing multicast traffic using a binary tree pair. In one example implementation, process 500 may be performed by node 110. In another example implementation, some or all of process 500 may be performed by another device or group of devices including or excluding node 110.

As shown in FIG. 5, process 500 may include receiving multicast traffic (block 505) and obtaining flow information associated with received traffic (block 510). For example, node 110 may receive multicast traffic from network 120 and may obtain information associated with a flow to which the traffic corresponds from packets (e.g., packet headers, trailers, payloads, etc.) associated with the traffic. The traffic may be received by I/O unit 220 associated with node 110. The information associated with the flow may include a source address, a destination address, a flow identifier, a type of traffic (e.g., data, video, voice, text, etc.), a type of service (e.g., a messaging service; a security service; an operation, administration, and maintenance (OAM) service; and/or some other type of service), and/or other information associated the flow.

In one example, I/O unit 220 may retrieve information associated with a group membership associated with the multicast traffic and/or the flow to identify a quantity of nodes 110 and/or hosts 115 that are to receive a copy of the traffic.

As also shown in FIG. 5, process 500 may include generating a unique flow identifier based on the flow information (block 515) and retrieving information associated with a selected binary tree (block 520). For example, a load balancing application, hosted by packet forwarding component 305 within I/O unit 220, may use a hash function and/or some other mathematical function to generate a unique identifier that corresponds to the flow. The identifier may be generated, using the hash and/or mathematical function, based on the information associated with the flow obtained from the traffic.

Load balancing processor 310 may use the unique identifier to select a binary tree that is to be used to process the traffic. For example, load balancing processor 310 may determine whether the unique identifier corresponds to a binary tree (e.g., T tree 420 with respect to FIG. 4) associated with a binary tree pair (e.g., binary tree pair 410 with respect to FIG. 4) or an inverse binary tree (e.g., T' tree 430 with respect to FIG. 4) associated with the binary tree pair. Based on the determination, load balancing processor 310 may select the binary tree or the inverse binary tree to process the traffic and may retrieve information associated with the binary tree and/or the inverse binary tree from a memory associated with node 110.

In another example implementation, load balancing processor 310 may uniquely identify the flow based on the information associated with the flow, which may not include generating the unique identifier. Load balancing processor 310 may, for example, use the uniquely identified flow to select the binary tree or the inverse binary tree to process the traffic.

As further shown in FIG. 5, if traffic is to be processed using a binary tree (block 525—binary tree), then process 500 may include sending the traffic to another I/O unit 220, via switch fabric 230, for processing based on the binary tree (block 530). For example, load balancing processor 310 may determine that the unique identifier (or information associated with the flow) corresponds to the binary tree (e.g., T tree 420 with respect to FIG. 4) and may identify a root node (e.g., root node 422 of FIG. 4) within the binary tree. Based on the identification of the root node, load balancing processor 310 may send the traffic, via switch fabric 230, to another I/O unit 220, that corresponds to the root node within the binary tree, to be processed. The other I/O unit 220 may receive the traffic, may replicate the traffic in order to generate copies of the traffic, and may send a copy of the traffic to a pair of other I/O units 220 that corresponds to a pair of leaf nodes (e.g., leaf nodes 424) that are logically interconnected (e.g., associated with a distance of one) with the other I/O unit 220.

Each I/O unit 220, of the pair of other I/O units 220, may replicate the traffic and may send a copy of the traffic to respective other pairs of I/O units 220 that are logically interconnected (e.g., associated with a distance of two relative to root node 422) with the pair of I/O units 220 to be processed. The replicating and/or the sending of copies of the traffic may be performed by additional pairs of I/O units 220 (e.g., associated with increasing distances relative to root node 422) until all I/O units 220, associated with the binary tree, have received a copy of the traffic.

The other I/O unit 220 (e.g., corresponding to root node 422) that received the traffic and I/O units 220 (e.g., corresponding to leaf nodes 422) associated with the binary tree that received a copy of the traffic, may perform one or more replications to generate additional copies of the traffic to be sent to nodes 110 and/or hosts 115 associated with the group membership of the traffic. Alternatively, or additionally, each I/O unit 220 may send a copy of the traffic to a respective node 110 and/or host 115 that each I/O unit 220 corresponds and/or is interconnected.

As yet further shown in FIG. 5, if traffic is to be processed using an inverse binary tree (block 525—inverse binary tree), then process 500 may include sending the traffic to a further I/O unit 220, via switch fabric 230, for processing based on the inverse binary tree (block 535). For example, load balancing processor 310 may determine that the unique identifier (or information associated with the flow) corresponds to the inverse binary tree (e.g., T' tree 430 with respect to FIG. 4) and may identify a root node (e.g., root node 432 of FIG. 4) within the inverse binary tree. Based on the identification of the root node, load balancing processor 310 may send the traffic, via switch fabric 230, to another I/O unit 220, that corresponds to the root node within the inverse binary tree, to be processed. The other I/O unit 220 may receive the traffic, may replicate the traffic in order to generate copies of the traffic, and may send a copy of the traffic to a pair of other I/O units 220 that corresponds to a pair of leaf nodes (e.g., leaf nodes 434) that are logically interconnected (e.g., associated with a distance of one) with the other I/O unit 220.

Each I/O unit 220, of the pair of other I/O units 220, may replicate the traffic and may send a copy of the traffic to respective other pairs of I/O units 220 that are logically interconnected (e.g., associated with a distance of two relative to root node 432) with the pair of I/O units 220 to be processed. The replicating and/or the sending of copies of the traffic may be performed by additional pairs of I/O units 220 (e.g., associated with increasing distances relative to root node 432) until all I/O units 220, associated with the inverse binary tree, have received a copy of the traffic.

The other I/O unit 220 (e.g., corresponding to root node 432) that received the traffic and I/O units 220 (e.g., corresponds to leaf nodes 434) associated with the inverse binary tree that received a copy of the traffic, may perform one or more replications to generate additional copies of the traffic to be sent to nodes 110 and/or hosts 115 associated with the group membership of the traffic. Alternatively, or additionally, each I/O unit 220 may send a copy of the traffic to a respective node 110 and/or host 115 that each I/O unit 220 corresponds and/or is interconnected.

FIGS. 6A and 6B are diagrams illustrating example sub tree data structure 600 (hereinafter referred to as "data structure 600") and sub tree data structure 630 (hereinafter referred to as "data structure 630"). Data structure 600 and/or data structure 630 may be stored in a memory associated with node 110 and/or a memory associated with all or a portion of I/O units 220 associated with node 110. As illustrated in FIG. 6A, data structure 600 may include a sub tree set field 605.

Sub tree set 605 may store information associated with a sub tree set that includes a set of identifiers that correspond to I/O units 220, which are used by load balancing processor 310 to process multicast traffic. For example, sub tree set 610 may include a set of identifiers that are associated with I/O units 220 that participate in replication operations (e.g., to generate a copy of multicast traffic) associated with node 110. Set 610 may include an identifier that corresponds to a root node 612. For example, the identifier (e.g., "1") that corresponds to root node 612 may be associated with a particular I/O unit 220 (e.g., I/O unit 220-1) that performs replication operations. Set 610 may include other identifiers that correspond to leaf nodes 613. For example, the identifiers (e.g., "2" and "3") that correspond to leaf nodes 613 may be associated with other I/O units 220 (e.g., I/O unit 220-2 and I/O unit 220-3) that perform replication operations and which may receive multicast traffic from I/O unit 220 corresponding to root node 612).

Data structure 600 may store information associated with other sub tree sets (e.g., sets 614 through 622). Each of the other sub tree sets may include an identifier that corresponds to a respect root node. For example, set 614 may include a root node that corresponds to I/O unit 220-2; set 616 may include a root node that corresponds to I/O unit 220-3; set 618 may include a root node that corresponds to I/O unit 220-4; set 620 may include a root node that corresponds to I/O unit 220-5; and set 622 may include a root node that corresponds to I/O unit 220-6. Alternatively, or additionally, each of the other sub trees may include an identifier that corresponds to respective leaf nodes. For example, set 614 may include leaf nodes that correspond to I/O unit 220-3 and I/O unit 220-4; set 616 may include leaf nodes that correspond to I/O unit 220-4 and I/O unit 220-5; set 618 may include leaf nodes that correspond to I/O unit 220-5 and I/O unit 220-6; set 620 may include leaf nodes that correspond to I/O unit 220-6 and I/O unit 220-1; and set 622 may include leaf nodes that correspond to I/O unit 220-1 and I/O unit 220-2.

The quantity of sub trees and/or I/O units 220 that are included in the sub trees may be configured as hardware or software by a user of node 110. For example, increasing a quantity of I/O units 220 (e.g., leaf nodes) within a set (e.g., from 2 to 3, 4, 5, etc.) may reduced a quantity of replications that are to be performed on a per-I/O unit 220 basis, which may reduce an amount of jitter that is introduced, by the replication operation, when processing packets associated with the multicast traffic. However, increasing the quantity of I/O units 220 in each set may increase a quantity of replication notifications (e.g., when copies of multicast traffic is transferred from the root node to leaf nodes), which may increase bandwidth utilization associated with node 110. Additionally, a degree of overlap between leaf nodes between sets, as described below in FIG. 6B, may also be configured as hardware associated with node 110 or via software by a user of node 110.

As illustrated in FIG. 6B, data structure 630 may include a sub tree set field 635. In a manner similar to that described above (e.g., with respect to FIG. 6A), sub tree set field 635 may store information associated with sub tree sets (e.g., sets 640 through 655). Each of the sub tree sets may include an identifier, associated with a particular I/O unit 220 that corresponds to a respective root node. For example, set 640 may include a root node that corresponds to I/O unit 220-1; set 645 may include a root node that corresponds to I/O unit 220-3; set 650 may include a root node that corresponds to I/O unit 220-5; and set 655 may include a root node that corresponds to I/O unit 220-2. Alternatively, or additionally, each of the sub trees may include an identifier that corresponds to respective leaf nodes. For example, set 640 may include leaf nodes that correspond to I/O unit 220-2 and I/O unit 220-3; set 645 may include leaf nodes that correspond to I/O unit 220-4 and I/O unit 220-5; set 650 may include leaf nodes that correspond to I/O unit 220-6 and I/O unit 220-1; and set 655 may include leaf nodes that correspond to I/O unit 220-4 and I/O unit 220-6.

Each of the I/O units 220 are included in two sub tree sets of data structure 630 (e.g., an overlap value, "R"=2) as compared to three sub tree sets of data structure 600 of FIG. 6A (e.g., an overlap value, R=3). For example, I/O unit 220-1 is included in sets 640 and 650 of data structure 630 and is included in sets 610, 620, and 622 of data structure 600. Therefore, the quantity of sub tree sets in which a particular I/O unit 220 is included may be set by hardware associated with node 110 and/or by software by a user of node 110. Increasing the overlap value may increase a quantity of combinations in which replication operations, and thus bandwidth and/or processing capacity, can be distributed and/or allocated among I/O units 220 of node 110. Alternatively, or additionally, one or more sub tree sets, within data structure 600 or data structure 630, can be duplicated to increase a quantity of sub tree sets to be used by node 110 when processing multicast traffic.

Although FIGS. 6A and 6B show example fields of data structure 600 and data structure 630, in other implementations, data structure 600 and/or data structure 630 may contain different fields and/or additional fields than depicted in FIGS. 6A and/or 6B. In other implementations, there may be additional sub trees, fewer sub trees, differently arrange sub trees, or different sub trees than depicted in FIGS. 6A and/or 6B. Additionally, or alternatively, in other implementations, the sub tree sets may include additional leaf nodes, fewer leaf nodes, different leaf nodes, or differently arranged leaf nodes than depicted in FIGS. 6A and/or 6B. For example, the quantity and/or configuration of sub trees, within data structure 600 and/or data structure 630, may change when the quantity of I/O units 220 performing replications changes, when the overlap value changes, when the quantity of leaf nodes in each set changes, when a quantity of duplicate sets changes, etc.

Figure 7:
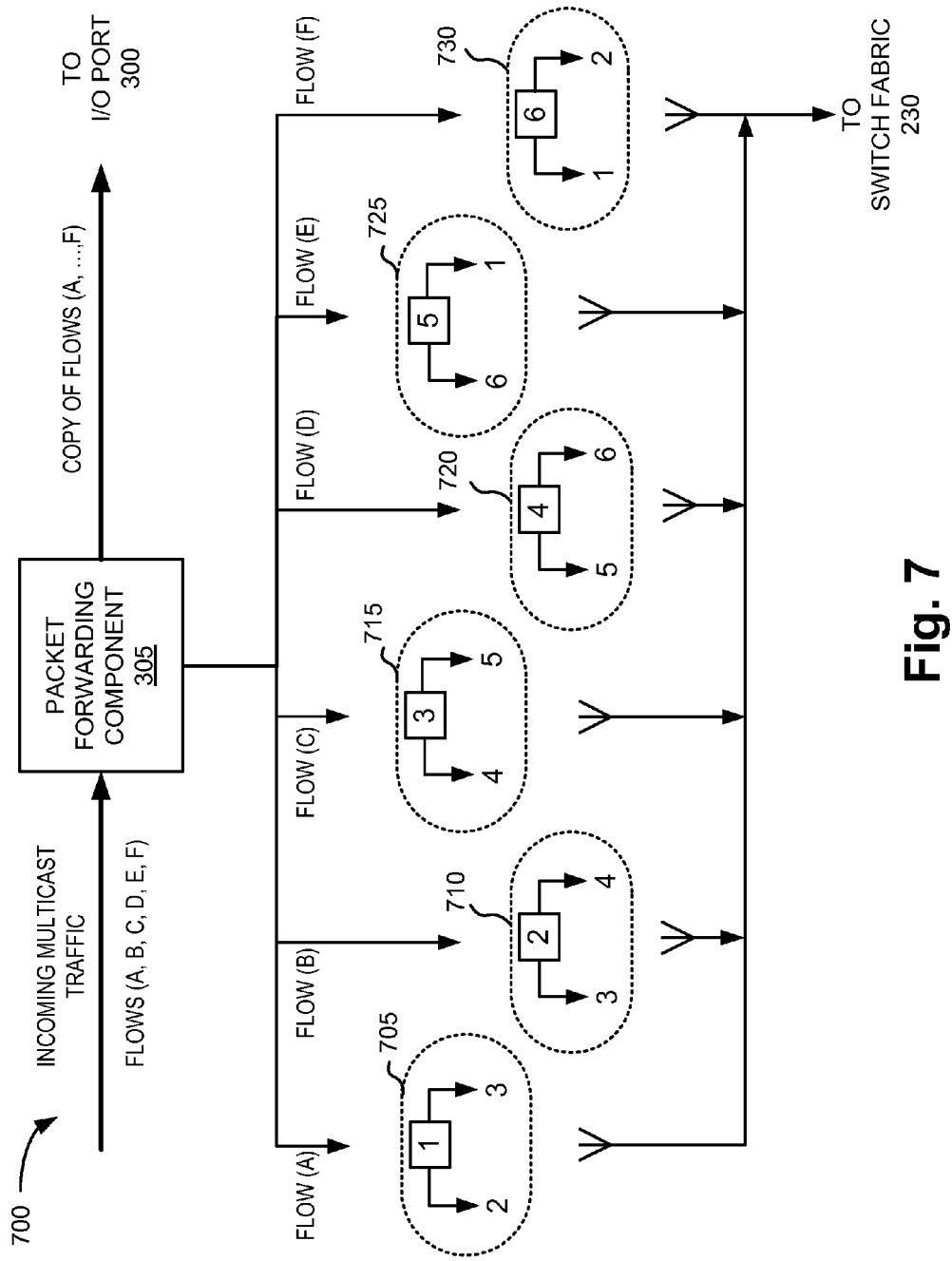
FIG. 7 is a diagram illustrating an example load balancing operation, using a group of sub trees, according to an implementation described herein.

FIG. 7 is a diagram illustrating an example load balancing operation 700, using a group of sub trees, according to an implementation described herein. For example, packet forwarding component 305, associated with I/O unit 220, may receive incoming multicast traffic, via I/O port 300, intended for nodes 110 and/or hosts 115 based on a group membership associated with the multicast traffic. As shown in FIG. 7, the multicast traffic may include one or more flows (e.g., shown as flows (A, B, C, D, E, F)). The load balancing application, hosted by load balancing processor 310 within packet forwarding component 305, may determine with which flow particular multicast traffic is associated (e.g., based on flow information associated with the multicast traffic) in a manner similar to that described above (e.g., with respect to FIG. 3). Load balancing processor 310 may using a hash function and/or some other mathematical function to generate a unique value associated with the flow based on the flow information obtained from the multicast traffic. Load balancing processor 310 may use information associated with a sub tree, obtained from a sub tree data structure (e.g., data structure 600 of FIG. 6A) to determine to which other I/O unit 220 the multicast traffic (e.g., associated with the identified flow) is to be forwarded for processing. More particularly, load balancing processor 310 may select a sub tree (e.g., sub tree 705, . . . , or sub tree 730) that is to be used to process the multicast traffic that corresponds to the unique value associated with the flow.

In another example implementation, load balancing processor 310 may identify the flow, based on the flow information and may select the sub tree that corresponds to the identified flow in a manner that does not include the unique value.

Sub trees 705-730 may permit multicast traffic to be processed by all or a portion of I/O units 220 within node 110 in a manner that controls and/or manages utilization of bandwidth and/or processing resources, associated with node 110, among I/O units 220. Sub trees 705-730 may correspond to sub tree sets 610 and 614-622 (e.g., of FIG. 6A), respectively. For example, sub tree 705 may include a root node (e.g., associated with I/O unit 220-1; shown as "1") that corresponds to root node 612 (FIG. 6A). Sub tree 705 may include leaf nodes (e.g., associated with I/O units 220-2 and 220-3; shown as "2" and "3") that correspond to leaf nodes 613 (FIG. 6A). The leaf nodes may be logically interconnected with the root node (e.g., as shown by the arrows in sub tree 705). Sub trees 710-730 may each include a root node that are logically interconnected with leaf nodes in a manner similar to that described with respect to sub tree 705 and/or sub tree set 610.

In one example, I/O unit 220 may generate the unique value (e.g., using the hash function) and/or may identify a particular flow (e.g., flow (A)) based on the flow information obtained from the multicast traffic. Based on the unique value and/or the identified flow, load balancing processor 310 may retrieve, from a sub tree data structure (e.g., data structure 600) stored in a memory associated with node 110 and/or I/O unit 220, information associated with a sub tree that corresponds to the unique value and/or the identified flow (e.g., sub tree 705). From the information associated with the sub tree, load balancing processor 310 may forward, via switch fabric 230, the incoming multicast traffic (e.g., associated with flow (A)) to another I/O unit 220 (e.g., I/O unit 220-1) that corresponds to a root node of the sub tree. It should be appreciated that the forwarding of the incoming multicast traffic is generally performed without replicating or generating a copy of the multicast traffic, which preserves bandwidth and/or processing resources associated with node 110.

The other I/O unit 220 may receive the multicast traffic and may replicate the multicast traffic in order to send, via switch fabric 230, a copy of the multicast traffic to a pair of I/O units 220 (e.g., I/O unit 220-2 and/or I/O unit 220-3) that correspond to the logically interconnected leaf nodes within the sub tree (e.g., sub tree 705). Based on a quantity of nodes 110 and/or hosts 115 included in a membership group associated with the identified flow, the I/O units 220 associated with the sub tree may replicate the multicast traffic. For example, if sixty (60) nodes 110 and/or hosts 115 are included in the membership group, then each I/O unit 220, associated with the sub tree, may replicate the multicast traffic in order to generate a portion of the sixty copies of multicast traffic (e.g., 20 copies). In another example, implementation, the root node and/or leaf nodes may generate unequal portions of the quantity of copies to be generated. For example, I/O unit 220-1 (e.g., the root node) may generate 15 copies, I/O unit 220-2 may generate 25 copies, and/or I/O unit 220-3 may generate 20 copies.

I/O units 220 associated with sub tree 705 may send the generated copies of multicast traffic to a nodes 110 and/or hosts 115 included in the group membership. For example, I/O unit 220-1 may send all or a portion of the generated copies to nodes 110 and/or hosts 115 with which I/O unit 220-1 is interconnected via one or more I/O ports 300. Alternatively, or additionally, each I/O unit 220, associated with sub tree 705, may send the generated copies of the multicast traffic to other I/O units 220 to be sent to nodes 110 and/or hosts 115.

In another example, I/O unit 220 may receive other multicast traffic and use another sub tree (e.g., sub tree 710, . . . , or 730) to process the multicast traffic. In one example, load balancing processor 310 may determine that the traffic is associated with flow (B) and may send the traffic to another I/O unit 220 (e.g., I/O unit 220-2) that corresponds to the root node associated with sub tree 710. In another example, load balancing processor 310 may determine that the traffic is associated with flow (C) and may send the traffic to a further I/O unit 220 (e.g., I/O unit 220-3) that corresponds to the root node associated with sub tree 715. Load balancing processor 310 may continue to receive multicast traffic and may, in a manner similar to that described above, process the multicast traffic using a sub tree that corresponds to the identified flow (and/or a generated unique value associated with the flow). Over a period of time all or a portion of the flows associated with the multicast traffic may be processed based on all or a portion of the sub trees, which enables bandwidth resources and/or processing capacity of node 110 to be allocated and/or distributed among I/O units 220 in a controlled and/or managed fashion.

In the event that a particular I/O unit 220 malfunctions or ceases to operate, one or more sub trees in which the particular I/O unit 220 is included may be masked in a manner that enables node 110 to continue to processes multicast traffic. For example, a user of node 110 may cause sub trees 715, 720 and/or 725 to become disabled and/or bypassed when I/O unit 220-3 ceases to operate and/or malfunctions. The user may, for example, cause information associated with the sub trees 715, 720, and/or 725 to be removed from a sub tree data structure (e.g., data structure 600 of FIG. 6A), to be over written, and/or ignored. In this example, load balancing processor 310 may process multicast traffic using other sub trees 705, 710, and/or 730. Processing the multicast traffic using the other sub trees provides additional processing diversity and/or flexibility to node 110, which may reduce packet loss associated with I/O unit 220 failure and/or malfunction.

Figure 8:
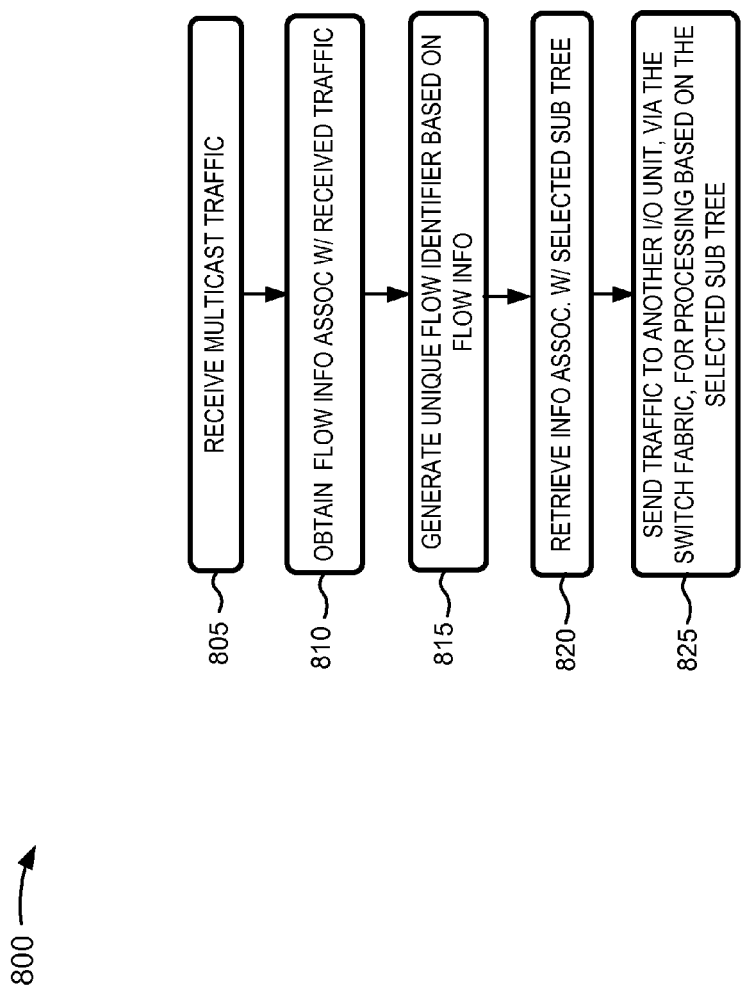
FIG. 8 is a flow chart illustrating an example process for processing multicast traffic using a group of sub trees.

FIG. 8 is a diagram illustrating example process 800 for processing multicast traffic using a group of sub trees. In one example implementation, process 800 may be performed by node 110. In another example implementation, some or all of process 800 may be performed by another device or group of devices including or excluding node 110.

As shown in FIG. 8, process 800 may include receiving multicast traffic (block 805), obtaining flow information associated with received traffic (block 810), and generating a unique flow identifier based on the flow information (block 815). For example, node 110 may receive multicast traffic and a load balancing application (e.g., hosted by a particular I/O unit 220 that received the traffic) may, in a manner similar to that described above (e.g., with respect to block 505 of FIG.

5), obtain information associated with a flow (e.g., information associated with flow (D) of FIG. 7) from packets associated with the traffic.

Load balancing processor 310 may generate a unique flow identifier associated with the flow. For example, load balancing processor 310 may use a hash function and/or some other mathematical function to generate a unique identifier that corresponds to the flow. The identifier may be generated, using the hash and/or mathematical function, based on the information associated with the flow obtained from the traffic.

As also shown in FIG. 8, process 800 may include retrieving information associated with a selected sub tree (block 820). Load balancing processor 310 may determine to which sub tree the unique identifier corresponds. Based on the determination, load balancing processor 310 may select a sub tree (e.g., sub tree 720 of FIG. 7, which corresponds to flow (D)) to be used to process the traffic and may retrieve information associated with the sub tree from a sub tree data structure stored in a memory associated with node 110.

In another example implementation, load balancing processor 310 may identify the flow based on the information associated with the flow, which may not include generating the unique identifier. Load balancing processor 310 may, for example, use the identified flow to select the sub tree with which to process the traffic.

As further shown in FIG. 8, process 800 may include sending traffic to another I/O unit 220, via switch fabric 230, for processing based on the selected sub tree (block 825). For example, load balancing processor 310 may determine that the unique identifier (or information associated with the flow, such as flow (D)) corresponds to the selected sub tree (e.g., sub tree 720 of FIG. 7) and may identify a particular I/O unit 220 (e.g., I/O unit 220-4) that corresponds to a root node within the selected sub tree. Based on the identification of the root node, load balancing processor 310 may send the multicast traffic, via switch fabric 230, to the particular I/O unit 220 to be processed. The particular I/O unit 220 may receive the multicast traffic, may replicate the multicast traffic in order to generate copies of the multicast traffic, and may send a copy of the multicast traffic to other I/O units 220 (e.g., I/O units 220-5 and 220-6) that correspond to leaf nodes within the selected sub tree.

I/O units 220 (e.g., I/O unit 220-4, 220-5, and/or 220-6) associated with the selected sub tree (e.g., sub tree 720) may replicate the multicast traffic based on nodes 110 and/or hosts 115 included in a membership group associated with the identified flow. Each I/O unit 220, associated with the selected sub tree, may replicate the multicast traffic in order to generate copies of the multicast traffic for a respective portion of the quantity of nodes 110 and/or hosts 115 included in the group membership.

I/O units 220 associated with the selected sub tree may send the generated copies of multicast traffic to nodes 110 and/or hosts 115 included in the group membership. For example, I/O unit 220 associated with the root node (e.g., I/O unit 220-4) may send a respective portion of the copies of multicast traffic to nodes 110 and/or hosts 115 with which I/O unit 220, associated with the root node, is interconnected. I/O units 220 associated with the leaf nodes (e.g., I/O unit 220-5 and/or I/O unit 220-6) may send other respective portions of the copies of multicast traffic to nodes 110 and/or hosts 115 with which I/O units 220, associated with the leaf nodes, are interconnected.

Alternatively, or additionally, each I/O unit 220, associated with the selected sub tree, may send all or a portion of the generated copies of the multicast traffic to other I/O units 220 to be sent to nodes 110 and/or hosts 115 included in the group membership. For example, I/O unit 220-4 may send all or a portion of the generated copies of multicast traffic to another I/O unit 220 (e.g., an I/O unit 220 that is not included in sub tree 720, such as I/O unit 220-3) to be outputted to nodes 110 and/or hosts 115 with which the other I/O unit 220 is interconnected. I/O unit 220-3 may, in another example, send all or a portion of the generated copies of multicast traffic to another I/O unit 220 (e.g., an I/O unit 220 that is not included in any of sub trees 705 through 730, such as I/O unit 220-M) to be outputted to nodes 110 and/or hosts 115 with which the other I/O unit 220 is interconnected.

Although FIGS. 5 and 8 show example processes 500 and 800 for processing multicast traffic using a binary tree pair and a group of sub trees, respectively, in another example implementation, a process for processing multicast traffic may be executed by I/O unit 220 using the binary tree pair and the group of sub trees. For example, I/O unit 220 may receive multicast traffic and may process a portion of flows associated with the multicast traffic using one or more sub trees. Additionally, or alternatively, I/O unit 220 may process another portion of the flows associated with the multicast traffic using a binary tree and/or an inverse binary tree.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 5 and 8, the order of the blocks may be modified in other implementations. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a first input/output (I/O) unit of a plurality of I/O units associated with a network node, particular multicast traffic intended for a plurality of host devices;
identifying, by the first I/O unit, a flow associated with the particular multicast traffic based on information obtained from the particular multicast traffic;
retrieving, by the first I/O unit and from a memory associated with the network node, information associated with two or more multicast trees,
the two or more multicast trees including information associated with all or a portion of the plurality of I/O units, associated with the network node, that process multicast traffic,
each multicast tree, of the two or more multicast trees, including nodes that correspond to all or the portion of the plurality of I/O units,
a first multicast tree, of the two or more multicast trees, being a binary tree,
a second multicast tree, of the two or more multicast trees, being an inverse binary tree corresponding to an inverse of the binary tree,
a root node, of the second multicast tree, corresponding to a leaf node of the first multicast tree;
identifying, by the first I/O unit, a particular tree, of the two or more multicast trees, that corresponds to the identified flow,
the particular tree including information associated with one or more I/O units of the plurality of I/O units; and
transferring, by the first I/O unit, the particular multicast traffic to a second I/O unit, of the one or more I/O units, based on the identification of the particular tree,
transferring the particular multicast traffic enabling:
the second I/O unit to distribute a copy of the transferred particular multicast traffic to other I/O units of the one or more I/O units, and
the one or more I/O units to process the particular multicast traffic in a manner that utilizes bandwidth or processing resources in a controlled manner and to send a copy of the multicast traffic to each of the plurality of host devices based on processing the particular multicast traffic.

2. The method of claim 1, where identifying the flow further includes:
generating, using a hash function or a mathematical function, a unique value associated with the flow based on the information associated with the flow.

3. The method of claim 2, where identifying the particular tree includes:
comparing the unique value, associated with the flow, to a plurality of values, stored in the memory, to identify one of the plurality of values that matches the unique value; and
retrieving information associated with the particular tree that corresponds to the identified one of the plurality of values.

4. The method of claim 1, where identifying the particular tree includes:
determining that the second I/O unit corresponds to a root node within the particular tree; and
determining that the other I/O units correspond to leaf nodes within the particular tree,
where the leaf nodes are logically interconnected to the root node.

5. The method of claim 1, where transferring the particular multicast traffic to the second I/O unit includes:
sending the particular multicast traffic via a switch fabric associated with the network node.

6. The method of claim 1, where the two or more multicast trees include a plurality of sub trees, and
where each of the sub trees includes:
a root node that corresponds to a different one of the plurality of I/O units that processes multicast traffic, and
at least two leaf nodes that are logically interconnected with the root node and that correspond to at least two of the plurality of I/O units.

7. The method of claim 1, where the binary tree or the inverse binary tree includes:
a root node that corresponds to one of the plurality of I/O units that processes multicast traffic;
a first pair of leaf nodes that are logically interconnected to the root node,
where the first pair of leaf nodes correspond to a first pair of I/O units of the plurality of I/O units;
a second pair of leaf nodes that are logically interconnected to one node of the first pair of leaf nodes,
where the second pair of leaf nodes correspond to a second pair of I/O units of the plurality of I/O units; and
a third pair of leaf nodes that are logically interconnected to another node of the first pair of leaf nodes,
where the third pair of leaf nodes correspond to a third pair of I/O units of the plurality of I/O units.

8. The method of claim 7, where the first pair of leaf nodes is associated with a first logical distance relative to the root node, and
where the second pair of leaf nodes and the third pair of leaf nodes are associated with a second logical distance relative to the root node.

9. The method of claim 1, where the two or more multicast trees enable all or the portion of the plurality of I/O units to process a plurality of flows of multicast traffic in a manner that controls utilization of bandwidth or processing resources and, which prevents the network node from becoming congested.

10. A network node comprising:
a memory to store information associated with a plurality of sub trees that corresponds to a plurality of input/output (I/O) units associated with the network node,
each sub tree, of the plurality of sub trees, including nodes that correspond to I/O units of the plurality of I/O units,
a first sub tree, of the plurality of sub trees, being a binary tree,
a second sub tree, of the plurality of sub trees, being an inverse binary tree corresponding to an inverse of the binary tree,
a root node, of the second sub tree, corresponding to a leaf node of the first sub tree;
a switch fabric to transfer multicast traffic between the plurality of I/O units;
a first I/O unit of the plurality of I/O units to:
receive particular multicast traffic intended for a plurality of host devices connected to the network node,
identify one or more of the plurality of sub trees with which to process the particular multicast traffic based on one or more flows associated with the particular multicast traffic,
send, to a second I/O unit of the plurality of I/O units and via the switch fabric, a portion of the particular multicast traffic associated with one of the one or more flows that corresponds to a particular sub tree of the plurality of sub trees,
the particular sub tree including information associated with the second I/O unit and at least two other I/O units of the plurality of I/O units; and
the second I/O unit to:
receive the portion of the particular multicast traffic, and
send a copy of the portion of the particular multicast traffic to the at least two I/O units to permit the second I/O unit and the at least two I/O units to generate a plurality of copies to be outputted to one or more of the plurality of host devices.

11. The network node of claim 10, where the plurality of sub trees enable the network node to process the particular multicast traffic in a manner that allocates utilization of bandwidth or processing resources, associated with the network node, across the plurality of I/O units based on information associated with the one or more flows.

12. The network node of claim 10, where, when identifying the one or more of the plurality of sub trees, the first I/O unit is to:
identify the one or more flows associated with the particular multicast traffic based on information associated with the one or more flows obtained from the particular multicast traffic, and
determine that the information, associated with the one or more flows, corresponds to information, associated with the one or more of the plurality of sub trees, stored in the memory.

13. The network node of claim 12, where, when identifying the one or more of the plurality of sub trees, the first I/O unit is to:
determine that information associated with the one of the one or more flows is associated with the particular sub tree.

14. The network node of claim 10, where the second I/O unit is further to:
determine that information, associated with another one of the one or more flows, is associated with another sub tree of the one or more sub trees, and
identify a third I/O unit, of the plurality of I/O units, to transfer another portion of the particular multicast traffic that corresponds to the other one of the one or more flows,
where the third I/O unit is identified based on the other sub tree.

15. The network node of claim 10, where the plurality of I/O units performs replication operations to generate copies of multicast traffic to be sent to host devices associated with a group membership that corresponds to the multicast traffic to be sent to the host devices.

16. The network node of claim 10, where a sub tree, of the plurality of sub trees, includes a root node that corresponds to a third I/O unit, of the plurality of I/O units, and two or more leaf nodes that corresponds to two or more I/O units of the plurality of I/O units, and
where the third I/O unit sends a copy of other multicast traffic, received from the first I/O unit, to the two or more I/O units to enable the third I/O unit or the two or more I/O units to generate a quantity of copies of the other multicast traffic that corresponds to a quantity of the plurality of host devices.

17. The network node of claim 16, where the third I/O unit sends a respective portion of the generated quantity of copies of the other multicast traffic to a fourth I/O unit of the plurality of I/O units, and
where the fourth I/O unit sends the respective portion of the generated quantity of copies to a portion of the plurality of host devices that are interconnected to the fourth I/O unit.

18. The network node of claim 10, where the first I/O unit is further to:
receive other multicast traffic, after receiving the particular multicast traffic, that is to be processed by the particular sub tree,
determine that the second I/O unit or one of the at least two other I/O units have failed,
identify another sub tree, of the plurality of sub trees, with which to process the other multicast traffic,
where the other sub tree includes information associated with a third I/O unit of the plurality of I/O units, and
send the other multicast traffic to the third I/O unit to be processed based on the information associated with the third I/O unit included in the other sub tree.

19. A method performed by a network node, the method comprising:
receiving, by a first input/output (I/O) unit of a plurality of I/O units associated with the network node, multicast traffic intended for a plurality of host devices connected to the network node;
identifying, by the first I/O unit and based on a flow associated with the multicast traffic, whether the multicast traffic is to be processed based on a binary tree or an inverse binary tree,
the binary tree including:
a first root node associated with a second I/O unit of the plurality of I/O units, and
a plurality of leaf nodes, associated with two or more I/O units of the plurality of I/O units, that are logically connected to the first root node, and
the inverse binary tree including:
a second root node associated with a third I/O unit of the plurality of I/O units, and
a plurality of other leaf nodes, associated with two or more other I/O units of the plurality of I/O units, that are logically connected to the second root node,
the second root node corresponding a leaf node of the binary tree;
sending, by the first I/O unit and to the second I/O unit, the multicast traffic to be processed based on the binary tree when the identified flow corresponds to the binary tree,
sending the multicast traffic to the second I/O unit permitting the second I/O unit and the two or more I/O units to process the multicast traffic in a manner that enables a copy of the multicast traffic to be outputted to the plurality of host devices; and
sending, by the first I/O unit and to the third I/O unit, the multicast traffic to be processed based on the inverse binary tree when the identified flow corresponds to the inverse binary tree,
sending the multicast traffic to the third I/O unit permitting the third I/O unit and the two or more other I/O units to process the multicast traffic in a manner that enables a copy of the multicast traffic to be outputted to the plurality of host devices.

20. The method of claim 19, where the binary tree and the inverse binary tree enable the network node to process the multicast traffic in a manner that distributes utilization of bandwidth or processing resources, associated with the network node, across the plurality of I/O units to prevent one or more of the plurality of I/O units from becoming congested.

21. The method of claim 19, where sending the multicast traffic to the second I/O unit includes:
- sending the multicast traffic, to the second I/O unit, via a switch fabric associated with the network device,
  - where the multicast traffic is sent to the second I/O unit in a manner that does not include utilizing bandwidth resources to generate, by the first I/O unit, a copy of the multicast traffic; and
- where sending the multicast traffic to the third I/O unit includes:
  - sending the multicast traffic, to the third I/O unit, via the switch fabric,
    - where the multicast traffic is sent to the third I/O unit in a manner that does not include utilizing the bandwidth resources to generate, by the first I/O unit, the copy of the multicast traffic.

22. The method of claim 19, where the second I/O unit is associated with one of the plurality of other leaf nodes within the inverse binary tree; and
where the third I/O unit is associated with one of the plurality of leaf nodes within the binary tree.

23. The method of claim 19, further comprising:
- sending, by the second I/O unit or the two or more I/O units, one or more copies of the multicast traffic to a portion or the plurality of host devices; and
- sending, by the second I/O unit or the two or more I/O units, another one or more copies of the multicast traffic to a fourth I/O unit, of the plurality of I/O units, to permit the fourth I/O unit to send the other one or more copies to another portion of the plurality of host devices.

24. The method of claim 19, where processing the multicast traffic using the binary tree and the inverse binary tree enables the network node to process the multicast traffic with a throughput that is greater than another throughput associated with processing the multicast traffic without the binary tree or the inverse binary tree.

* * * * *

UNITED STATES PATENT AND TRADEMARK OFFICE
CERTIFICATE OF CORRECTION

PATENT NO. : 8,699,486 B1
APPLICATION NO. : 12/961960
DATED : December 7, 2010
INVENTOR(S) : Yong Luo et al.

Page 1 of 1

It is certified that error appears in the above-identified patent and that said Letters Patent is hereby corrected as shown below:

In the Claims

Please correct claim 2 as follows:

Column 19, lines 44 and 45, after "flow" delete "further".

Please correct claim 9 as follows:

Column 20, line 41, after "and," delete "which".

Signed and Sealed this
Fifteenth Day of July, 2014

Michelle K. Lee
*Deputy Director of the United States Patent and Trademark Office*